United States Patent [19]
Bernard et al.

[11] Patent Number: 5,352,484
[45] Date of Patent: Oct. 4, 1994

[54] METHOD OF DENSIFYING A POROUS SUBSTRATE BY MEANS OF A MATRIX CONTAINING CARBON

[75] Inventors: Bruno C. Bernard, Eusines; Christian B. Brosse, Le Haillan; Jean-Claude Cavalier, Le Pian Medoc, all of France

[73] Assignee: Societe Europeenne de Propulsion, Suresnes, France

[21] Appl. No.: 823,835

[22] Filed: Jan. 17, 1992

[30] Foreign Application Priority Data

Jan. 18, 1991 [FR] France .................... 91/00592

[51] Int. Cl.$^5$ .................... B05D 3/02
[52] U.S. Cl. .................... 427/228; 427/294; 427/345; 427/346; 427/350; 427/369; 427/402; 427/407.1; 427/430; 427/443.2
[58] Field of Search ........... 427/228, 346, 345, 294, 427/350, 369, 402, 407.1, 443.2, 430

[56] References Cited

U.S. PATENT DOCUMENTS

| | | | |
|---|---|---|---|
| 2,962,386 | 11/1960 | Doll et al. | 427/228 |
| 3,558,344 | 1/1971 | Peterson et al. | 427/228 |
| 3,810,780 | 5/1974 | Ardary et al. | 427/228 |
| 4,339,021 | 7/1982 | Kosoda et al. | 427/228 |
| 4,350,718 | 9/1982 | Huber | 427/228 |
| 4,937,101 | 6/1990 | Gray | 427/228 |

FOREIGN PATENT DOCUMENTS

| | | | |
|---|---|---|---|
| 660107 | 3/1963 | Canada | 427/228 |
| 0307968 | 3/1989 | European Pat. Off. | |
| 2631784 | 1/1978 | Fed. Rep. of Germany | 427/228 |
| 8605774 | 10/1986 | World Int. Prop. O. | |

*Primary Examiner*—Janyce Bell
*Attorney, Agent, or Firm*—Weingarten, Schurgin, Gagnebin & Hayes

[57] ABSTRACT

A method of densifying a porous substrate by means of a matrix containing carbon, for obtaining an article made of a composite material, the method comprising the following steps:

providing on one side of a substrate to be densified a slip containing submicron carbon powder;

establishing a pressure difference to force the slip through the substrate;

filtering the liquid that has passed through the substrate to retain the carbon powder inside the substrate; and when densification of the substrate by means of the carbon powder has terminated, drying the densified substrate and transforming a carbon precursor introduced into the substrate into carbon by carbonization, thereby binding the powder constituting the matrix.

20 Claims, 2 Drawing Sheets

METHOD OF DENSIFYING A POROUS SUBSTRATE BY MEANS OF A MATRIX CONTAINING CARBON

The present invention relates to a method of densifying a porous substrate by means of a matrix containing carbon, for obtaining an article made of a composite material.

More particularly, the field of the present invention is that of composite materials having fiber reinforcement, in particular carbon fiber reinforcement, and a matrix of carbon or mainly of carbon.

Composite carbon/carbon (C/C) materials with fiber reinforcement and a carbon matrix are used in various applications which require their thermostructural properties, in particular, i.e. their high mechanical strength and their ability to retain such strength at high temperatures. Thus, C/C composite materials are used in the field of friction to make disk brakes, in particular disk brakes for aircraft or for ground vehicles, in the aerospace field for making space vehicles or the nozzles of engines or other engine components, and also in the field of biomaterials.

In spite of their high performance, one of the main limitations on extending the use of C/C composites is their high manufacturing cost.

Manufacturing a C/C composite generally comprises making up the fibrous reinforcement, or "preform", and then densifying the preform by means of a carbon matrix.

The preform is made, for example, from threads, cables, felts, or fabrics themselves made of carbon or of a carbon precursor, with the precursor being transformed into carbon by heat treatment prior to densification.

Densification is performed using a liquid or a gas.

When using a liquid, the preform is impregnated with a resin having a high coke content, i.e. a resin that leaves a carbon residue on being subjected to heat treatment. To achieve a sufficient degree of densification, it is necessary to perform a plurality of consecutive cycles each comprising a resin impregnation stage, a polymerization stage, and a carbonization stage.

A gas is used by performing chemical vapor infiltration. The preform is placed in a vessel into which a gas is admitted under special conditions of temperature and pressure enabling the gas to leave a solid deposit of carbon on the fibers of the preform, right into the core thereof. The gas may be constituted, for example, by one or more hydrocarbons that give carbon on cracking.

A major drawback of the above densification methods lies in the time required to achieve a sufficient degree of densification, particularly when using a gas, which explains the high cost of manufacture. Thus, for example, it frequently happens that densifying a carbon preform by chemical vapor infiltration requires several hundreds of hours.

In addition, it is difficult to obtain uniform density with the above densification methods. In particular, when using chemical vapor infiltration, it is practically inevitable that the densification takes place more quickly near the surface of the preform than in its core, thus giving rise to a density gradient across the thickness of the preform.

French patent application FR-A-2 526 785 describes a method of making an alumina-alumina composite in which the aluminum matrix is obtained by infiltrating an alumina powder into a mold that contains a bed of alumina fibers. A slip is prepared using an alumina powder having a mean grain size of about 1 micron, and the slip is introduced into the top of the mold while a vacuum is formed at the bottom thereof.

An object of the present invention is to provide a method that likewise makes use of the technique of infiltration of a very fine powder under pressure to densify a substrate by means of a carbon matrix.

According to the invention, this object is achieved by means of a method comprising the following steps:

providing on one side of a substrate to be densifted a slip containing submicron carbon powder;

establishing a pressure difference to force the slip through the substrate;

filtering the liquid that has passed through the substrate to retain the carbon powder inside the substrate; and when densification of the substrate by means of the carbon powder has terminated, drying the densifted substrate and transforming a carbon precursor introduced into the substrate into carbon by carbonization, thereby binding the powder constituting the matrix.

The carbon precursor, e.g. constituted by a resin, may be introduced into the substrate after it has been densifted by means of carbon powder and after it has been dried, with the resin providing the cohesion required in the matrix by bonding the particles of powder to one another. The final cycle of impregnation with the carbon precursor, polymerization, and carbonization thereof may be repeated.

In a variant, the carbon precursor is introduced into the substrate simultaneously with the carbon powder, the precursor being in the form of liquid mixed with the carbon powder in the slip.

The concentration in carbon powder in the slip is for example comprised between 30% and 50% in weight.

Other powders may also be mixed with the carbon powder in the slip, in particular powders of materials that inhibit oxidization so as to confer better resistance to oxidization on the composite material when in an oxidizing atmosphere. For example, the oxidization inhibitor may be selected from boron carbide, boron nitride, silicon carbide, silicon boride, or a refractor.,., oxide or carbide.

Compared with the known techniques of densification by means of a liquid or a gas, the method of the invention makes it possible to obtain a considerable reduction in the time required for manufacture while simultaneously providing density that is constant throughout the volume of the material and giving rise to materials having comparable performance and even performance that is improved in some respects. For example, with relatively thick parts (about 100 mm thick) the total factory time normally required for manufacture may be reduced to two weeks instead of several months as when performing chemical vapor infiltration.

The carbon precursor used for impregnating the substrate that has been densifted by means of carbon powder may be a resin having a relatively high coke content, e.g. a phenol resin or a furan resin or a pitch of petroleum or of coal.

The carbon powder used is a submicron powder, in particular carbon black, which generally has a mean grain size lying in the range 0.1 micron to 1 micron.

After impregnation by means of the carbon precursor and after transformation of the precursor into carbon, a graphitization step may be performed.

It is thus possible to make a composite material having a graphite matrix by means of the technique of aspiration of a fine powder, whereas when this technique is used directly with graphite powder, it can give rise to compacting problems because of the flaky structure of graphite.

A particular implementation of the invention is described below by way of non-limiting example.

BRIEF DESCRIPTION OF THE DRAWINGS

In the accompanying drawings:

FIG. 1 shows a porous substrate 10 to be densifted by means of carbon, placed in the bottom of a tank 20 (FIG. 1).

Figure 1:
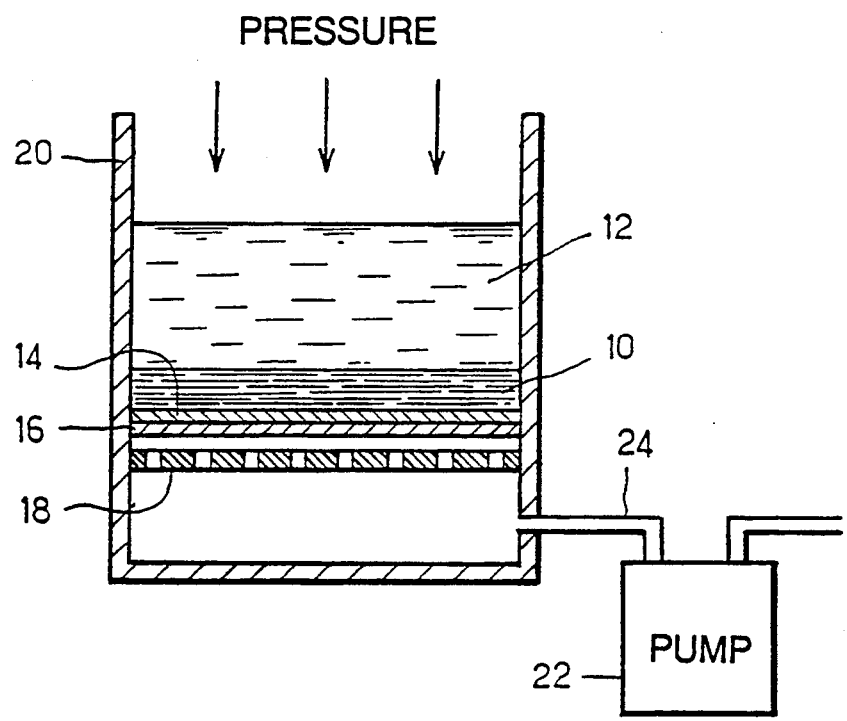
FIG. 1 is a highly diagrammatic section through an installation enabling the method of the invention to be performed.

Densification is performed by introducing an ultra-fine powder of carbon in suspension in a slip 12 poured over the substrate 10. The slip 12 is obtained from a mixture of carbon black, a liquid in which it is suspended, e.g. water, and a deflocculating agent, with the mixture being passed through a homogenizer.

A fine filter 14 is placed beneath the substrate to filter the water of the slip while retaining the carbon powder. The filter 14 is supported by a screen 16 situated above a perforated wall 18.

The slip 12 is caused to pass through the substrate 10 by setting up a pressure difference between the bottom portion of the tank 20 beneath the filter 14 and the top portion of the tank. This pressure difference may lie in the range 6 bars to at least 30 bars depending on the thickness of the substrate and it is produced by exerting extra pressure on the slip overlying the substrate 10, and optionally applying suction to the bottom of the tank. The aspiration may be produced by means of a vacuum pump 22 connected to the bottom of the tank by means of a pipe 24. The water that passes through the filter 14, the intermediate screen 16, and the wall 18 may be extracted via the pipe 24.

The passage of the slip through the substrate 10 may be facilitated by subjecting the tank 20 to vibration. To this end, the tank is mounted on a vibrating table or is coupled to a transducer that generates ultrasonic vibration.

EXAMPLE

The substrate 10 is constituted by a flat stack of layers of carbon fabric to a total thickness of 100 mm, with the layers being interconnected by needling. The fibers occupy 25% of the initial volume, i.e. the initial porosity is 75%.

The slip 12 is constituted by a mixture of water and carbon black having a mean grain size of about 0.2 microns. The slip contains about 1 part by weight of carbon per part by weight of water.

A pressure of 30 bars is exerted on the slip 12 and the bottom face of the filter 14 is maintained under a primary vacuum (about 20 mbars).

The slip infiltrates into the substrate 10 which is densified progressively by the carbon powder that is retained by the filter 14.

Densification is terminated after about 4 hours.

The densified substrate 10 is removed from the tank 12 and is slowly dried in an oven. Weighting the substrate makes it possible to establish that it has a relative density of 1.31, representing a residual porosity of 28%, with its porosity thus being reduced from 75% to 28% in a single operation.

The densifted and dried substrate 10 is then subjected to impregnation by means of a phenol resin followed by polymerization and carbonization of the resin. Resin impregnation is performed under pressure, e.g. using the installation shown in FIG. 1. The total duration of the cycle is about 12 days.

After this impregnation-polymerization-carbonization cycle, the measured relative density is 1.41. It rises to 1.43 after a second cycle identical to the first. The second cycle can therefore generally be considered as being superfluous because of the small increase in density that it provides.

Figure 2:
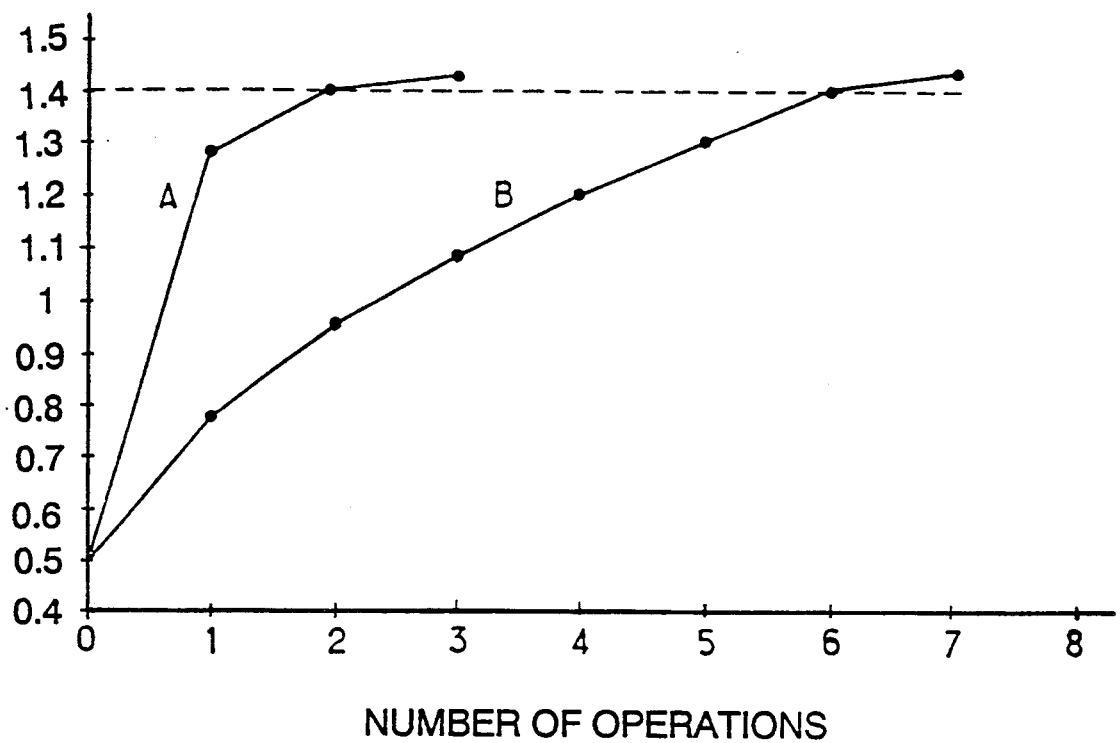
FIG. 2 is a graph showing the densification rates obtained using a method of the invention and a prior art method.

Curve A in FIG. 2 shows the change in the relative density of the densified material as a function of the number of operations, where the first operation is densification under pressure by means of carbon black, and the second and third operations are the two cycles of impregnation-polymerization-carbonization.

An article in composite material obtained after one impregnation-polymerization-carbonization cycle is subjected to a tensile test giving the following results:

Ts = 81 MPa, where Ts is the tensile strength;
El = 1% where El is the elongation at break; and
E = 19 GPa, where E is the modulus of elasticity.

A section through the material shows that its density is uniform throughout its thickness.

Analogous results are measured on an article in composite material obtained after two impregnation-polymerization-carbonization cycles, confirming the superfluous nature of the second cycle.

COMPARATIVE EXAMPLE NO. 1

By way of comparison, a substrate identical to substrate 10 is subjected to densification using a liquid, the densification comprising seven impregnation-polymerization-carbonization cycles, with impregnation being performed likewise with a phenol resin. The total duration of each cycle is about 12 days (minimum time interval between starting two consecutive cycles).

Curve B in FIG. 2 shows the change in density of the densifted material as a function of the number of operations. It can be seen that it is only at the end of the sixth operation (sixth cycle) that a relative density of 1.41 is obtained, i.e. equal to that obtained by the material in the method of the above example after two operations.

An article in the resulting composite material is subjected to the same tensile test as in the previous example. The results obtained are as follows:

Ts = 78 MPa;
El = 0.79%;
E = 25 GPa.

The mechanical properties of the material obtained by the method of the invention are substantially equivalent to those obtained by densification using a liquid, although its elongation at break is larger. In contrast, the total time required for densifying the material obtained by the method of the invention, including the final impregnation-polymerization-carbonization cycle is considerably shorter, since it is about 2 weeks.

In the above, it is assumed that the substrate is densified with carbon black powder.

One or more other powder materials could be added to the carbon powder in the slip 12.

Thus, oxidization inhibitors may be added in the form of powder in the matrix of the composite material. These inhibitors may be constituted by a material selected from carbides (such as $B_4C$, SIC), nitrides (such as BN), or oxides ($SiO_2$). The oxidization inhibitor(s) is/are intimately mixed with the carbon powder when preparing the slip. The presence of an oxidization inhibitor provides a composite material that has better performance in an oxidizing atmosphere, given that a problem encountered with carbon matrix composite materials is degradation by the carbon oxidizing.

In addition, the resin binding the particles of powder in the matrix may be introduced into the matrix in powder form directly with the carbon powder. The slip then comprises carbon powder, resin powder, and optionally oxidization inhibitor powder. A carbon precursor resin suitable for being introduced in the form of a powder is the "RS 101" phenol resin provided by the French firm RHONE POULENC.

The densification method of the invention may be implemented on substrates other than those formed by a stack of flat layers, to obtain articles in composite material having different shapes.

Figure 3:
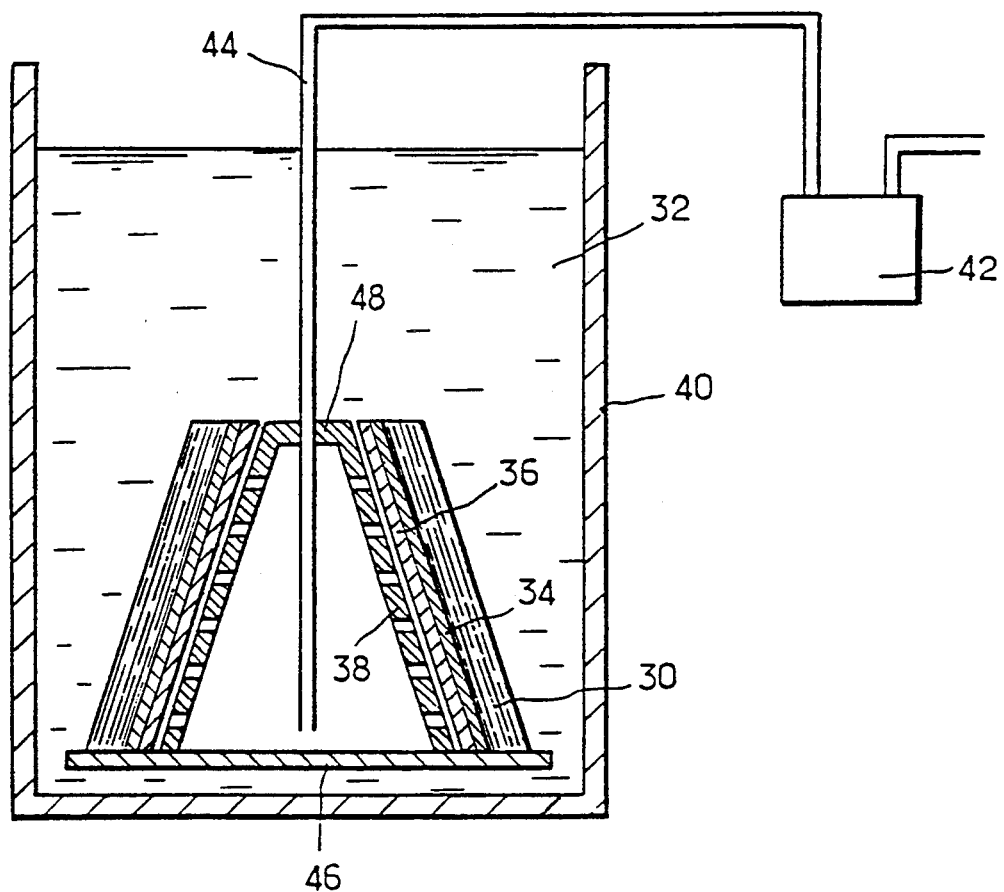
FIG. 3 is a highly diagrammatic section through an installation enabling the method of the invention to be used for densifying parts that are conical.

FIG. 3 shows an example of an installation for densifying a substrate 30 that is conical in shape (or more precisely in the shape of a truncated cone).

The substrate is placed in a tank 40 having a perforated wall 38 having a conical shape corresponding to that of the substrate and placed with its axis vertical. The substrate 30 is situated above the perforated wall 38 and a filter 34 and an intermediate screen 36 are interposed in that order between the substrate and the wall 38. The slip 32 is poured over the substrate. The chamber 50 delimited by the conical perforated wall 38 is closed by a bottom 46 at its bottom end and by a wall 48 at its top end, and it is connected to a vacuum pump 42 by a pipe 44.

We claim:

1. A method of densifying a porous carbon substrate by means of a matrix containing carbon, for obtaining an article made of composite material, comprising the following steps:
    introducing into a first side of a porous carbon substrate to be densified a suspension containing submicron carbon powder and a carbon precursor including one of a liquid resin and a resin powder;
    establishing a pressure difference to force the suspension through the substrate;
    providing a filter on a second side of the substrate opposite the first side of the substrate, for filtering the suspension to retain the carbon powder inside the substrate and progressively densifying the substrate with the carbon powder that is retained by the filter to produce a densified substrate; and
    drying the densified substrate and transforming the carbon precursor in the substrate into carbon by carbonization thereby binding the carbon powder constituting the matrix.

2. A method according to claim 1, wherein the carbon precursor is a resin powder.

3. A method according to claim 1, carbon precursor is a liquid.

4. A method according to claim 1, wherein the carbon powder is carbon black having a submicron means grain size.

5. A method according to claim 1, wherein the suspension further includes a powder of a material that inhibits oxidation mixed with the carbon powder.

6. A method according to claim 1, wherein after said carbon precursor has carbonized, the resulting material is subjected to a graphitization operation.

7. A method according to claim 1, wherein vibration is applied to the carbon substrate while the suspension is passing therethrough.

8. A method according to claim 3, wherein the carbon powder is carbon black having a submicron means grain size.

9. A method according to claim 4, wherein the suspension further includes a powder of a material that inhibits oxidation mixed with the carbon powder.

10. A method according to claim 5, wherein after the carbon precursor has carbonized, the resulting material is subjected to a graphitization operation.

11. A method according to claim 6, wherein vibration is applied to the substrate while the suspension is passing therethrough.

12. A method of densifying a porous carbon substrate by means of a matrix containing carbon, for obtaining an article made of composite material, comprising the following steps:
    introducing into a first side of a porous carbon substrate to be densified a suspension containing submicron carbon powder and a carbon precursor including one of a liquid resin and a resin powder;
    establishing a pressure difference to force the suspension through the substrate;
    providing a filter on a second side of the substrate opposite the first side of the substrate, for filtering the suspension to retain the carbon powder inside the substrate and progressively densifying the substrate with the carbon powder that is retained by the filter to produce a densified substrate;
    drying the densified substrate and transforming the carbon precursor in the substrate into carbon by carbonization, thereby binding the carbon powder constituting the matrix; and
    vibrating the porous carbon substrate while the suspension is passing therethrough.

13. A method of densifying a porous carbon substrate by means of a matrix containing carbon, for obtaining an article made of composite material, comprising the following steps:
    introducing into a first side of a porous carbon substrate to be densified a suspension containing submicron carbon powder and a carbon precursor including one of a liquid resin and a resin powder;
    establishing a pressure difference to force the suspension through the substrate;
    providing a filter on a second side of the substrate opposite the first side of the substrate, for filtering the suspension to retain the carbon powder inside the substrate and progressively densifying the substrate with the carbon powder that is retained by the filter to produce a densified substrate;
    drying the densified substrate and transforming the carbon precursor in the substrate into carbon by carbonization, thereby binding the carbon powder constituting the matrix; and
    subjecting the bound carbon powder to a graphitization operation; and vibrating the porous carbon substrate while the suspension passing therethrough.

14. A method of densifying a porous carbon substrate by means of a matrix containing carbon, for obtaining an article made of composite material, comprising the following steps:

introducing into a first side of a porous carbon substrate to be densified a suspension containing carbon black having a submicron means grain size, a carbon precursor including one of a liquid resin and a resin powder, and a powdered material that inhibits oxidation;

establishing a pressure difference to force the suspension through the substrate;

providing a filter on a second side of the substrate opposite the first side of the substrate, for filtering the suspension to retain the carbon black inside the substrate and progressively densifying the substrate with the carbon black that is retained by the filter to produce a densified substrate;

drying the densified substrate and transforming the carbon precursor in the substrate into carbon by carbonization, thereby binding the carbon black constituting the matrix;

subjecting the bound carbon black to a graphitization operation; and vibrating the porous carbon substrate while the suspension is passing therethrough.

15. A method of densifying a porous carbon substrate by means of a matrix containing carbon, for obtaining an article made of composite material, comprising the following steps:

introducing into a first side of a porous carbon substrate to be densified a suspension containing carbon black having a submicron means grain size and a powdered material that inhibits oxidation;

establishing a pressure difference to force the suspension through the substrate;

providing a filter on a second side of the substrate opposite the first side of the substrate, for filtering the slip to retain the carbon black inside the substrate and progressively densifying the substrate with the carbon black that is retained by the filter to produce a densified substrate;

drying the densified substrate and transforming a resin, introduced by impregnation in the substrate after the substrate has been densified and dried, into carbon by carbonization, thereby binding the carbon black constituting the matrix;

subjecting the bound carbon black to a graphitization operation; and vibrating the porous carbon substrate while the slip is passing therethrough.

16. A method of densifying a porous carbon substrate by means of a matrix containing carbon, for obtaining an article made of composite material, comprising the following steps:

introducing into a first side of a porous carbon substrate to be densified a slip containing submicron carbon powder;

establishing a pressure difference to force the slip through the substrate;

providing a filter on a second side of the substrate opposite the first side of the substrate, for filtering the slip to retain the carbon powder inside the substrate and progressively densifying the substrate with the carbon powder that is retained by the filter to produce a densified substrate;

drying the densified substrate;

introducing a carbon precursor in resin form into the dried densified substrate; and transforming said carbon precursor in the densified substrate into carbon by carbonization thereby binding the carbon powder constituting the matrix.

17. A method according to claim 16, wherein the carbon powder is carbon black having a submicron means grain size.

18. A method according to claim 16, wherein the suspension further includes a powder of a material that inhibits oxidation mixed with the carbon powder.

19. A method according to claim 16, wherein after said carbon precursor has carbonized, the resulting material is subjected to a graphitization operation.

20. A method according to claim 16, wherein vibration is applied to the carbon substrate while the suspension is passing therethrough.

* * * * *

UNITED STATES PATENT AND TRADEMARK OFFICE
CERTIFICATE OF CORRECTION

PATENT NO. : 5,352,484
DATED : October 4, 1994
INVENTOR(S) : Bruno C. Bernard, et al.

It is certified that error appears in the above-indentified patent and that said Letters Patent is hereby corrected as shown below:

Column 2, line 46, "refractor.,,.," should read --refractory--.

Column 5, line 10, "SIC" should read --SiC--.

Column 5, line 57, "the suspension" should read --the slip--.

Column 6, line 2, "means" should read --mean--.

Column 6, line 14, "means" should read --mean---.

Column 7, line 1-2, "suspension passing" should read --suspension is passing--.

Column 7, line 37, "means" should read --mean--.

Column 7, line 44, "slip" should read --suspension--.

Column 8, line 10, "slip" should read --suspension--.

Column 8, line 17, "slip" should read --suspension--.

Column 8, line 19, "slip" should read --suspension--.

UNITED STATES PATENT AND TRADEMARK OFFICE
CERTIFICATE OF CORRECTION

PATENT NO.   : 5,352,484
DATED        : October 4, 1994
INVENTOR(S)  : Bruno C. Bernard, et al.

It is certified that error appears in the above-indentified patent and that said Letters Patent is hereby corrected as shown below:

Column 8, line 23, "slip" should read --suspension--.

Signed and Sealed this

Second Day of May, 1995

Attest:

BRUCE LEHMAN

*Attesting Officer*        *Commissioner of Patents and Trademarks*